United States Patent [19]

Kramer et al.

[11] 4,087,245

[45] May 2, 1978

[54] PROCESS FOR THE PREPARATION OF CONCENTRATED SOLUTIONS OF ANIONIC DYESTUFFS

[75] Inventors: Erich Kramer, Bergisch Gladbach; Wolf Eckhard Bleck, Leverkusen, both of Germany

[73] Assignee: Bayer Aktiengesellschaft, Leverkusen-Bayerwerk, Germany

[21] Appl. No.: 696,910

[22] Filed: Jun. 17, 1976

[30] Foreign Application Priority Data

Jun. 21, 1975 Germany .............................. 2527703

[51] Int. Cl.$^2$ ....................... C09B 67/00; D06P 1/645
[52] U.S. Cl. ......................................... 8/85 A; 8/1 W; 8/39 R; 8/41 R; 8/42 R; 8/76; 8/85 B; 8/88; 8/89 R; 8/92; 8/93
[58] Field of Search ........... 8/39 R, 41 R, 1 W, 85 B, 8/85 A, 88, 89 R, 92, 93, 42 R

[56] References Cited

U.S. PATENT DOCUMENTS 4,005,066   1/1977   Gottschalk et al. .............. 260/145 A

FOREIGN PATENT DOCUMENTS 2,209,478   9/1973   Germany.
7,204,084   10/1972  Netherlands.

1,418,794   12/1975  United Kingdom.
1,336,032   11/1973  United Kingdom.
944,409     11/1963  United Kingdom.

*Primary Examiner*—A. Lionel Clingman
*Attorney, Agent, or Firm*—Plumley & Tyner

[57] ABSTRACT

Stable, concentrated solutions of anionic dyestuffs are prepared by reacting the alkali metal or ammonium salts of anionic dyestuffs and brighteners, which are usually obtained from the industrial preparation process, in water-soluble organic solvents, optionally in the presence of water, with salts of nitrogen bases which impart hydrophilic properties, in accordance with the reaction equation

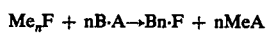

$$Me_nF + nB \cdot A \rightarrow Bn \cdot F + nMeA$$

in which
  Me denotes an alkali metal or ammonium ion,
  B denotes a protonated or quaternized nitrogen base,
  A denotes the anion of an acid,
  n denotes an integer from 1 to 4 and
  F denotes the anion of a dyestuff acid, and separating the resulting solutions from the salt n·MeA, which is insoluble in the reaction mass.

3 Claims, No Drawings

PROCESS FOR THE PREPARATION OF CONCENTRATED SOLUTIONS OF ANIONIC DYESTUFFS

The invention relates to a process for the preparation of stable, concentrated solutions of anionic dyestuffs and brighteners, which is characterised in that the alkali metal or ammonium salts of anionic dyestuffs and brighteners, which are usualy obtained from the industrial preparation process, are reacted in water-soluble organic solvents, optionally in the presence of water, with salts of nitrogen bases which impart hydrophilic properties, in accordance with the reaction equation $$Me_nF + nB \cdot A \rightarrow Bn \cdot F + nMeA$$

in which
Me denotes an alkali metal or ammonium ion,
B denotes a protonated or quaternised nitrogen base,
A denotes the anion of an acid,
n denotes an integer from 1 to 4 and
F denotes the anion of a dyestuff acid,
and the resulting solutions are separated from the salt n·MeA, which is insoluble in the reaction medium.

Since they can be handled more easily, can be measured out more simply and do not dust, solutions of anionic dyestuffs and brighteners have considerable advantages over the powders customarily used, both for the manufacturer and for the consumer. For these reasons, solutions, which are prepared by very diverse processes, are coming increasingly onto the market. However, all the processes known hitherto are subject to certain disadvantages.

Since the anionic dyestuffs and brighteners are usually isolated, in the course of their preparation, in the form of their alkali metal salts, especially in the form of their sodium salts, attempts have been made to bring these salts directly, with the aid of organic solvents and solubilising agents, into concentrated aqueous solutions or into concentrated solutions in organic solvents which are miscible with water. A process of this type is known, for example, from German Offenlegungsschrift (German Published Specification) No. 2,335,512. Since, however, the dyestuffs and brighteners usually still contain relatively large proportions of mineral salts, for example sodium chloride, and the sodium salts of the dyestuffs and brighteners have too low a solubility, concentrated solutions which are stable on storage can be prepared in this way only in isolated cases.

Therefore, a procedure was adopted in which, for example, dyestuffs are first freed from their foreign ions before concentrated solutions are prepared. This is generally carried out by converting the sodium salt of a dyestuff into the free dyestuff acid, isolating this acid and then converting it to a salt again, it being preferable directly to prepare a salt which displays very good solubility in the medium which it is intended to use for the subsequent concentrated solution. The process is time-consuming and fails in many cases, when the dyestuff acid cannot be obtained free from alkali metal ions.

The process is described, for example, in German Offenlegungsschrift (German Published Specification) No. 1,719,396. This literature reference also describes examples in which the sodium salts of dyestuffs which are substantially free from inorganic salts are used as starting materials, without describing how the dyestuffs are freed from inorganic salts.

The authors of German Offenlegungsschrift (German Published Specification) No. 2,209,478, who, in the case of azo dyestuffs, already carried out the diazotisation and coupling reactions in the solvent or solvent mixture which was later intended to be a constituent of the concentrated solution, believed they had found an elegant solution to the problem. However, this process has the decisive disadvantage that it can be used only for very few dyestuffs, since the diazotisation and coupling reactions frequently do not proceed, or do not proceed in a satisfactory manner, in the medium selected.

A further process for the preparation of concentrated stable liquid formulations of anionically soluble optical brighteners and dyestuffs is described in German Auslegeschrift (German Published Specification) No. 2,115,877. In this case the procedure is that the sodium salts of the dyestuffs are converted into sparingly soluble salts, for example into the calcium, barium, magnesium or zinc salts, these are isolated and suspended either in an aqueous solution of an amount of ammonia, or in an amount of an organic base, which is sufficient at least to neutralise the acid groups present in the dyestuff, and an inorganic acid, which forms a more sparingly soluble salt with the cation used to form the sparingly soluble dyestuff salt, is added to this suspension, or the sparingly soluble salt is suspended in water, or in a mixture of water and an organic solvent which is miscible with water and a salt of ammonia or of an organic base and an organic acid, which forms a more sparingly soluble salt with the cation used to precipitate the dyestuff, is added in such an amount that the cationic constituents are at least equivalent to the acid groups present in the dyestuff, and the inorganic salt which is precipitated is separated off from the resulting concentrated dyestuff solution by filtration.

With this process it is indeed possible to prepare concentrated solutions of anionic dyestuffs and brighteners, but the process is involved and time-consuming and in cases in which the dyestuffs form no sparingly soluble salts with calcium, magnesium, barium or zinc or other corresponding metals, is unsuccessful or is successful only to an incomplete extent. Moreover, with many dyestuffs and brighteners, above all with those which have several anionic groups, it is observed that sparingly soluble mixed salts of dyestuffs or brighteners are formed when the said salts are added. When the concentrated solution is prepared, only those cations which form insoluble mineral salts with the carbonate, phosphate, sulphate or corresponding anions which are added, are precipitated. The remaining alkali metal or ammonium ions remain in the solution and influence its storage stability or prevent the preparation of a solution of more than a certain concentration.

In addition, a certain proportion of dyestuff or brightener is lost during the operation of precipitation and filtering, this proportion being determined by the solubility.

Compared with this process, the process according to the invention surprisingly gives solutions of equal and higher concentration from a considerably simpler procedure and with a smaller loss of dyestuff or brightener.

In general, the process is carried out by stirring the alkali metal or ammonium salt of the anionic dyestuff or brightener with an at least equivalent amount of acid and nitrogen base in an organic solvent, the mixture being heated if appropriate. In some cases it is advantageous to employ the nitrogen base or the salt of the nitrogen base in excess, based on the stoichiometric amount of alkali metal or ammonium ions. After the reaction, the mixture is allowed to cool and the salts, which have precipitated, of the acid which has been added are filtered off. The organic solvents can contain up to 20% of water.

The process according to the invention is not restricted to dry products. In many cases the dyestuff pastes or brightener pastes, as obtained from the preparation process, or the aqueous press cakes, can be employed. The amount of alkali metal salt which may be additionally present does not interfere when the concentrated solution is prepared if, after the alkali metal content is determined, an at least stoichiometrically equivalent amount of a nitrogen base, which imparts hydrophilic properties, and an acid is added. In cases in which precipitation of the mineral salts remain incomplete because of a higher water content, it is possible to distil off the excess water from the mixture, since the organic solvents customarily used have a boiling point considerably higher than that of water.

In many cases the concentrated solutions of anionic dyestuffs and brighteners, obtained by the process according to the invention, can be diluted with any desired amount of water without their storage stability being decreased. In this way it is possible substantially to reduce the content of organic solvents in the liquid dyestuff formulation.

Dyestuffs which can be used are those of the monoazo, disazo or polyazo, anthraquinone, phthalocyanine, nitro, triphenylmethane, quinophthalone, xanthene or acine series, as well as optical brighteners of the stilbene series and also 1:1-copper, 1:1-nickel, 1:1-chromium, 1:2-chromium or 1:2-cobalt complex dyestuffs.

Metal complex dyestuffs are in themselves anionic dyestuffs; possible anionic groups for the other categories are carboxylic acid groups and, preferably, sulphonic acid groups.

Examples of suitable organic solvents for the process according to the invention are polyols, such as glycols and polyglycols, their monoalkyl ethers or dialkyl ethers, amides of lower carboxylic acids as well as lactams and mixtures of the solvents mentioned. Examples which may be mentioned are: ethylene glycol, diethylene glycol, ethylene glycol monomethyl ether and ethylene glycol monoethyl ether, diethylene glycol monomethyl ether, diethylene glycol monoethyl ether, diethylene glycol monopropyl ether and diethylene glycol monobutyl ether as well as the corresponding dialkyl ethers, acid amides, such as formamide and dimethylformamide, pyrrolidone and N-methylpyrrolidone. In the case of solvent mixtures, it is also possible to use solid products, such as urea or caprolactam.

Suitable nitrogen bases are hydroxyalkylamines and polyhydroxyalkylamines, polyhydroxyalkylamines and polyalkoxyalkylamines, such as, for example, ethanolamine, diethanolamine, triethanolamine, triisopropanolamine, tris-[2-(2-hydroxy-ethoxy)-ethyl]-amine, 2-amino-2-hydroxy-methyl-propane-1,3-diol, N-methyl-diethanolamine, N-ethyl-N-methoxyethylamine, morpholine, N-(2-hydroxyethyl)-morpholine and mixtures of these bases.

Suitable acids are, for example, hydrochloric acid, sulphuric acid, nitric acid, benzenesulphonic acid and substituted benzenesulphonic acids, benzene-1,3-disulphonic acid, naphthalene-1-sulphonic acid and naphthalene-2-sulphonic acid, naphthalene-1,4-disulphonic acid, naphthalene-1,5-disulphonic acid, naphthalene-1,6-disulphonic acid, naphthalene-2,6-disulphonic acid, naphthalene-2,7-disulphonic acid, oxalic acid, glutaric acid and succinic acid. Preferred acids are hydrochloric acid, sulphuric acid and oxalic acid.

EXAMPLE 1

200 g of a moist paste of the dyestuff

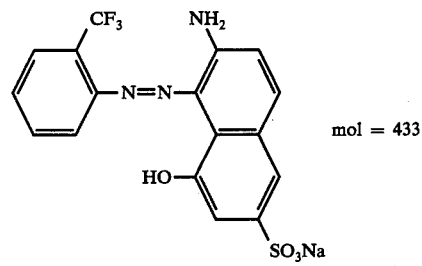

mol = 433 with a water content of about 31% are stirred in 100 g of tris-[2-(2-hydroxyethoxy)-ethyl]-amine, 178 g of glycol and 18 g of sulphuric acid (10.2 ml of 66° Be strength $H_2SO_4$) for one hour at 80°C. The mixture is allowed to cool and stirred for a further 12 hours. After clarifying by removing the sodium sulphate which has precipitated, about 460 g of a solution with a dyestuff content of about 29% (based on the Na salt) are obtained.

EXAMPLE 2

820 g of a paste of the dyestuff

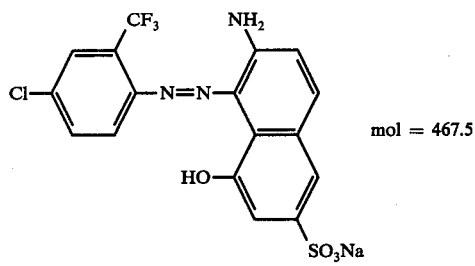

mol = 467.5 with a water content of about 43% are suspended in 1,885 g of diethylene glycol monomethyl ether and 520 g of tris-[2-(2-hydroxy-ethoxy)-ethyl]-amine. After adding 100 g of oxalic acid · $2H_2O$, the mixture is warmed slowly to 130° C, whilst distilling off water. After cooling to room temperature, the mixture is clarified by removing the salt which has precipitated. About 2,740 g of solution with a dyestuff content of about 17% (based on the Na salt) are obtained.

EXAMPLE 3

967 g of an isolated paste of the dyestuff

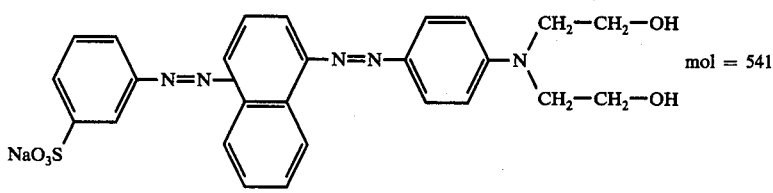

mol = 541 with a water content of about 44%, and 760 g of diethylene glycol monoethyl ether, 310 g of tris-[2-(2-hydroxyethoxy)-ethyl]-amine and 110 ml of hydrochloric acid (19.5° Be strength) are stirred together for 5 hours at 50° C and, after cooling, the solution is clarified. About 2,130 g of a solution with a dyestuff content of about 23% (based on the Na salt) are obtained.

EXAMPLE 4

896 g of a paste of the dyestuff

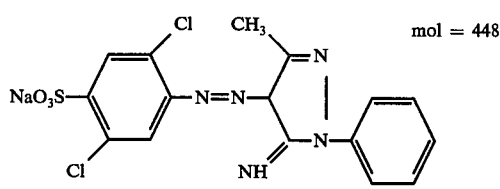

mol = 448 with a water content of about 50% are stirred in 1,900 g of diethylene glycol and 281 g of tris-[2-(2-hydroxy-ethoxy)-ethyl]-amine. 105 ml of hydrochloric acid (19.5° Be strength) are added and the mixture is warmed, whilst distilling off water. Heating is discontinued when a temperature of 130° C is set up in the reaction mixture. The mixture is stirred for a further 12 hours and clarified by removing the sodium chloride which has precipitated. About 2,500 g of solution with a dyestuff content of about 18% (based on the Na salt) are obtained.

EXAMPLE 5

448 g of the dyestuff

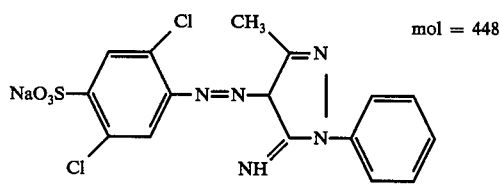

mol = 448 are stirred in 840 g of dimethylformamide, 150 g of triethanolamine and 102 ml of hydrochloric acid (19.5° Be strength). The mixture is warmed whilst distilling off water. Heating is discontinued when a temperature of 130° C is set up in the reaction mixture. The mixture is stirred for a further 12 hours and clarified. About 1,410 g of a solution with a dyestuff content of about 31% (based on the Na salt) are obtained.

EXAMPLE 6

449 g of the dyestuff

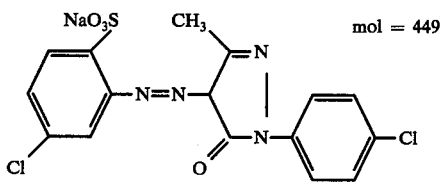

mol = 449 are stirred in 850 g of diethylene glycol monoethyl ether and 300 g of tris-[2-(2-hydroxy-ethoxy)-ethyl]-amine and 63 g of oxalic acid · 2H$_2$O are added. After 8 hours at 100° C, the mixture is allowed to cool and stirred for a further 16 hours. After clarification, about 1,590 g of a solution with a dyestuff concentration of about 28% (based on the Na salt) are obtained.

EXAMPLE 7

650 g of a paste of the dyestuff

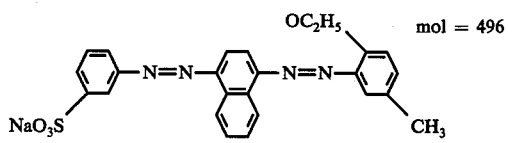

mol = 496 with a water content of about 24% are stirred in 950 g of diethylene glycol monoethyl ether and 281 g of tris-[2-(2-hydroxy-ethoxy)-ethyl]-amine. 102 ml of hydrochloric acid (19.5° Be strength) are added and the procedure of Example 4 is followed. The resulting solution (about 1,700 g) has a dyestuff content of about 28% (based on the Na salt).

EXAMPLE 8

44 g of sulphuric acid, corresponding to 25.1 ml of 66° Be strength sulphuric acid, are added, in a thin jet, to 160 g glycol and 250 g of tris-[2-(2-hydroxy-ethoxy)-ethyl]-amine, whilst stirring (pH = 5). 500 g of a paste of the dyestuff

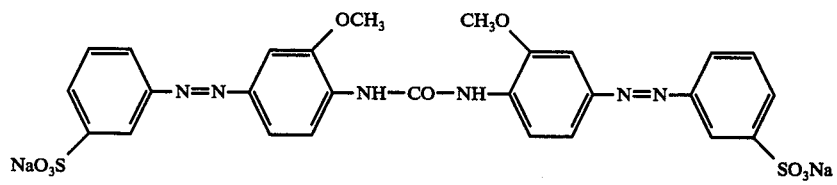

with a water content of about 50% are stirred into the solution. The mixture is warmed to 80° C. After applying a slight vacuum, water distils from the mixture. The vacuum amd the temperature of the mixture are increased slowly and the operation is discontinued when the pressure is 50° mm Hg and the temperature of the distillation residue is 100° C. After cooling to 40° C, the mixture is clarified by removing the sodium sulphate which has precipitated. The resulting solution has a dyestuff content of about 39% (based on the disodium salt). It can be diluted with water in any porportion.

EXAMPLE 9

A liquid dyestuff preparation can be obtained analogously to Example 8 when diethylene glycol is used place of glycol.

EXAMPLE 10

116 g of the brightener of the formula

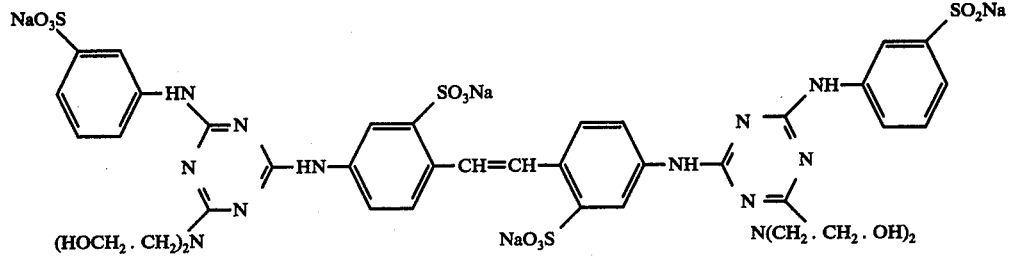

are introduced into 120 g of diethylene glycol, which has been stirred with 65 g of triethanolamine and 21 g of $H_2SO_4$ (corresponding to 12 ml of 66° Be strength $H_2SO_4$), and the mixture is warmed to 80° C. It is allowed to cool and the $Na_2SO_4$ which has precipitated is filtered off.

The resulting solution contains about 40% of the brightener (based on the tetrasodium salt). It can be diluted with water in any proportion.

We claim:

1. Process for the preparation of a concentrated solution of an anionic dyestuff or brightener wherein an alkali metal salt or ammonium salt of an anionic dyestuff or brightener is reacted in a water-soluble organic solvent with hydroxyalkylamine, polyhydroxyalkylamine, polyalkoxyalkylamine, and an acid or a salt of said amine with acid, and the resulting solution is separated from the precipitated alkali metal salt or ammonium salt.

2. Process of claim 1 wherein said hydroxyalkylamine, polyhydroxyalkylamine, polyalkoxyalkylamine, or salt thereof, is employed in excess, based on the stoichiometric amount of alkali metal ion or ammonium ion, and a reaction is carried out in the presence of up to 20% water.

3. Process of claim 1 wherein said hydroxyalkylamine, polyhydroxyalkylamine, or polyalkoxyalkylamine is selected from the group consisting of ethanolamine, diethanolamine, triethanolamine, triisopropanolamine, tris-[2-(2-hydroxy-ethoxy)-ethyl]-amine, 2-amino-2-hydroxy-methyl-propane-1,3-diol, N-methyldiethanolamine, N-ethyl-N-methoxyethylamine, morpholine, N-(2-hydroxyethyl)-morpholine and mixtures of these bases.

* * * * *